(12) United States Patent
Gandhi et al.

(10) Patent No.: US 8,923,882 B2
(45) Date of Patent: Dec. 30, 2014

(54) DETERMINING A DEPLOYMENT OF A WIRELESS NETWORK

(75) Inventors: Amol Gandhi, Narayangaon (IN);
Ganapathy Viswanath, Bangalore (IN);
Satish Chandra, Bangalore (IN);
Prashanth Lingala, Amberpet (IN);
Vilas Ingle, Bangalore (IN); Lokesh Sambasivan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 673 days.

(21) Appl. No.: 13/191,039

(22) Filed: Jul. 26, 2011

(65) Prior Publication Data

US 2013/0029587 A1    Jan. 31, 2013

(51) Int. Cl.
*H04W 74/00* (2009.01)
*H04W 16/20* (2009.01)

(52) U.S. Cl.
CPC ..................... *H04W 16/20* (2013.01)
USPC .............. 455/455; 455/11.1; 455/16; 455/20; 455/41.2; 455/3.05; 370/274; 370/315; 370/492; 375/211

(58) Field of Classification Search
CPC ... H04W 4/008; H04W 84/047; H04W 12/06; H04W 72/0406; H04W 72/04; H04W 88/04; H04W 28/16; G05B 2219/31162; G05B 19/05
USPC ......... 455/15, 7, 9, 11.1, 13.1, 16, 17, 20, 22, 455/24, 41.2, 408, 450, 455, 3.05; 370/274, 370/279, 293, 315, 492, 501; 375/211, 214
See application file for complete search history.

(56) References Cited

U.S. PATENT DOCUMENTS

| 2003/0063585 | A1* | 4/2003 | Younis et al. | 370/331 |
| 2004/0236547 | A1 | 11/2004 | Rappaport et al. | |
| 2005/0275527 | A1* | 12/2005 | Kates | 340/539.22 |
| 2009/0059814 | A1 | 3/2009 | Nixon et al. | |

FOREIGN PATENT DOCUMENTS

| EP | 1918794 | 5/2008 |
| WO | 2010045971 | 4/2010 |

OTHER PUBLICATIONS

Search Report for related EP Application No. 12 177 531.6, dated Oct. 11, 2012, 3 pgs.

* cited by examiner

*Primary Examiner* — Shaima Q Aminzay
(74) *Attorney, Agent, or Firm* — Brooks, Cameron & Huebsch, PLLC

(57) ABSTRACT

Methods, systems, and devices for determining a deployment of a wireless network are described herein. One method includes receiving, via a computing device, radio frequency data associated with a structure, wherein the structure includes a number of sensor nodes, receiving physical parameters associated with the structure, determining a number of relay nodes to deploy in the structure based, at least in part, on the radio frequency data and the physical parameters, and determining a location to deploy each of the number of relay nodes in the structure based, at least in part, on the radio frequency data and the physical parameters.

20 Claims, 3 Drawing Sheets

DETERMINING A DEPLOYMENT OF A WIRELESS NETWORK

TECHNICAL FIELD

The present disclosure relates to methods, systems, and devices for determining a deployment of a wireless network.

BACKGROUND

Structures (e.g., industrial plants, manufacturing facilities, refineries, etc.) may be outfitted with wireless sensor networks that may include, for example, a number of wireless nodes (e.g., wireless sensors and/or transmitters, among other nodes). A wireless sensor network may be used to sense (e.g., acquire, detect, and/or measure) a multitude of parameters and/or processes occurring within the structure and wirelessly communicate these parameters to one or more desired locations (e.g., a central computing device).

Wireless communication through the network may allow, for example, workflow facilitation, process streamlining and/or the attainment of manufacturing objectives, among other benefits. Additionally, costs (e.g., time, resource and/or monetary costs) associated with installing and/or maintaining wireless sensor networks may be less than costs associated with installing and/or maintaining traditional wired networks.

Communication between wireless nodes may be subject to a number of limitations. In a structure, communication between wireless nodes may be affected by, for example, interference, noise, dust, radiation and/or structural elements, among other limitations. Deployment (e.g., placement in the structure) of wireless nodes may require attention to these limitations and/or the capabilities of the nodes themselves, among other considerations.

Determining a deployment of wireless nodes in a structure by theoretical site surveying (e.g., wireless surveying) the structure may allow the collection of data relevant to the deployment, but may not provide, for example, visualization (e.g., display) of the actual deployment and/or prediction of the network's behavior after the deployment in the actual structure, among other information.

DETAILED DESCRIPTION

Methods, systems, and devices for determining a deployment of a wireless network are described herein. One or more method embodiments include receiving, via a computing device, radio frequency data associated with a structure, wherein the structure includes a number of sensor nodes, receiving physical parameters associated with the structure, determining a number of relay nodes to deploy in the structure based, at least in part, on the radio frequency data and the physical parameters, and determining a location to deploy each of the number of relay nodes in the structure based, at least in part, on the radio frequency data and the physical parameters.

Methods, systems, and devices in accordance with one or more embodiments of the present disclosure can determine a deployment of a wireless network based upon with consideration paid to structural and/or physical parameters of the structure. Additionally, one or more embodiments of the present disclosure can determine a deployment of a wireless network based upon radio frequency (RF) data associated with the structure. Additionally, one or more embodiments of the present disclosure can determine a deployment of a wireless network and display the determined deployment in a simulated environment. Accordingly, one or more embodiments of the present disclosure can predict a number of operations of the wireless network following deployment of the network in the structure. Additionally, one or more embodiments of the present disclosure can propose a number of configuration options associated with operation of the network.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of temperature sensors" can refer to one or more temperature sensors.

Figure 1:
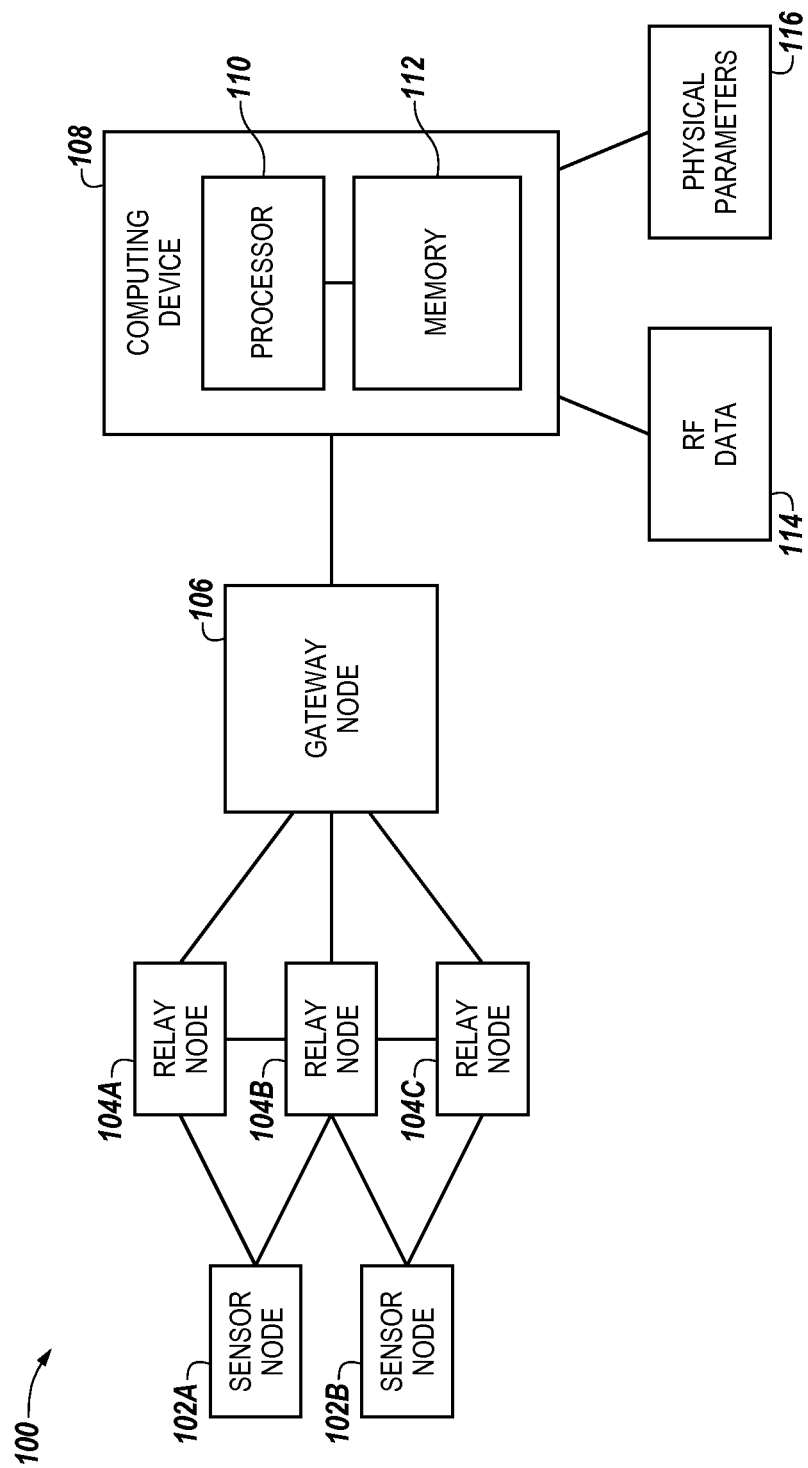
FIG. 1 is a block diagram illustrating a system for determining a deployment of a wireless network in accordance with one or more embodiments of the present disclosure.

FIG. 1 illustrates a system 100 for determining a deployment of a wireless network in accordance with one or more embodiments of the present disclosure. As shown in FIG. 1, system 100 includes a number of sensor nodes 102a and 102b communicatively coupled to a number of relay nodes 104a, 104b, and 104c. Sensor nodes 102a and 102b can be, for example, battery operated wireless transmitters. Relay nodes 104a, 104b, and 104c, can be, for example, wireless routers and/or infrastructure nodes. Although two sensor nodes and three relay nodes are shown in FIG. 1, system 100 is not limited to a particular number of sensor and/or relay nodes. A communicative coupling can include wired and/or wireless connections and/or networks such that data can be transferred in any direction between sensor nodes 102a and 102b and relay nodes 104a, 104b, and 104c. For example, a communicative coupling between sensor nodes 102a and 102b and relay nodes 104a, 104b, and 104c can include redundant and/or low-power frequency-hopping spread spectrum (FHSS) and/or direct-sequence spread spectrum (DSSS) wireless communication.

Although not shown in FIG. 1, sensor nodes 102a and 102b and relay nodes 104a, 104b, and 104c can be deployed in a structure. A structure can be an industrial plant, a manufacturing facility, a house, an office building, an apartment complex, and/or a hospital, among other types of structures. Structure can also refer to subsets of larger structures. For example, a structure can be a room, a department, a wing, and/or a laboratory, as well as combinations and/or portions of these examples and/or others. Embodiments of the present disclosure do not limit structure(s) to man-made structures; rather, a structure can be any enclosed (e.g., partially enclosed) area that has a capability to accommodate one or more deployed wireless networks. As discussed further below, sensor nodes 102a and 102b and relay nodes 104a, 104b, and 104c can be deployed in a structure at locations anywhere within the structure.

Although not shown in FIG. 1, sensor nodes 102a and 102b can include and/or be communicatively coupled to one or more sensors. Sensors can include devices configured to sense (e.g., acquire, detect, and/or measure) data from any suitable source. Data can include, for example, temperature data, pressure data, viscosity data, electrical data, light data, humidity, sound data, etc. Suitable sources can include systems and/or devices within and/or outside a structure from which a sensor can sense data (e.g., a hydraulic press, a furnace, etc).

As shown in FIG. 1, relay nodes 104a, 104b, and 104c are communicatively coupled to a gateway node 106. Gateway node 106 can be and/or include, for example, a device configured to communicate through multiple computing communication protocols. A communicative coupling between relay nodes 104a, 104b, and 104c and gateway node 106 can include wireless connections and/or networks such that data can be transferred in any direction between relay nodes 104a, 104b, and 104c and gateway node 106, such as, for example, an 802.11-based multi-hop mesh network.

Gateway node 106 is shown in FIG. 1 communicatively coupled to a computing device 108. Also shown in FIG. 1, computing device 108 can receive RF data 114 and physical parameters 116 associated with the structure, as discussed further below. Computing device 108 includes a processor 110 and a memory 112. As shown in FIG. 1, memory 112 can be coupled to processor 110.

Memory 112 can be volatile or nonvolatile memory. Memory 112 can also be removable (e.g., portable) memory, or non-removable (e.g., internal) memory. For example, memory 112 can be random access memory (RAM) (e.g., dynamic random access memory (DRAM), and/or phase change random access memory (PCRAM)), read-only memory (ROM) (e.g., electrically erasable programmable read-only memory (EEPROM), and/or compact-disk read-only memory (CD-ROM)), flash memory, a laser disk, a digital versatile disk (DVD), and/or other optical disk storage), and/or a magnetic medium such as magnetic cassettes, tapes, or disks, among other types of memory.

Further, although memory 112 is illustrated as being located in computing device 108, embodiments of the present disclosure are not so limited. For example, memory 112 can also be located internal to another computing resource, e.g., enabling computer readable instructions to be downloaded over the Internet or another wired or wireless connection.

Memory 112 can store executable instructions, such as, for example, computer readable instructions (e.g., software), for determining a deployment of a wireless network in accordance with one or more embodiments of the present disclosure. For example, memory 112 can store executable instructions for determining a deployment of a wireless network in accordance with one or more embodiments of the present disclosure. Memory 112 can store physical parameters associated with the structure, as discussed below.

Processor 110 can execute the executable instructions stored in memory 112 to determine a deployment of a wireless network in accordance with one or more embodiments of the present disclosure. For example, processor 110 can execute the executable instructions stored in memory 112 to determine a deployment of a wireless network and display a visual representation of the determined deployment in accordance with one or more embodiments of the present disclosure.

Figure 2:
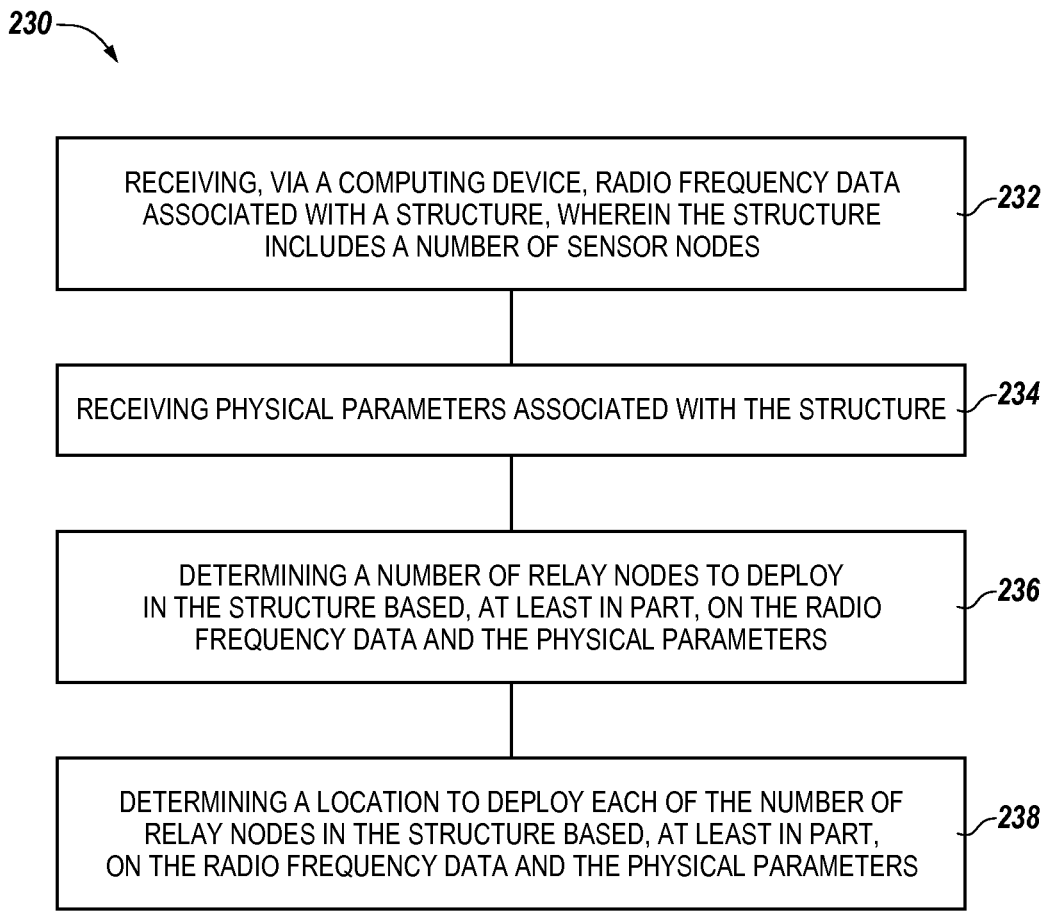
FIG. 2 illustrates a method for determining a deployment of a wireless network in accordance with one or more embodiments of the present disclosure.

FIG. 2 illustrates a method 230 for determining a deployment of a wireless network in accordance with one or more embodiments of the present disclosure. Method 230 can be carried out, for example, by computing device 108 previously discussed in connection with FIG. 1, and/or by any additional computing device(s) (not shown in FIG. 1).

At block 232, method 230 includes receiving, via a computing device, radio frequency data (e.g., RF data 114 previously discussed in connection with FIG. 1) associated with a structure, wherein the structure includes a number of sensor nodes. Sensor nodes can include, for example, sensor nodes 102a and 102b previously discussed in connection with FIG. 1. Receiving radio frequency (RF) data can include receiving test data obtained from elements of system 100 previously discussed in connection with FIG. 1, such as, for example, sensor nodes 102a and 102b. Receiving RF data can include scanning the entire free transmission frequency band of 2.4 GHZ and/or 5.6 GHz and/or scanning for WiFi signals present in the structure that may exist due to, for example, previous installations of wireless network(s). Additionally, receiving RF data can include determining a geographic location of the structure to estimate and/or predict effects from weather conditions on devices within the structure. Additionally, receiving RF data can include receiving data associated with pollution within and/or adjacent to the structure to estimate and/or predict effects on the network from pollution.

At block 234, method 230 includes receiving physical parameters (e.g., physical parameters 116 previously discussed in connection with FIG. 1) associated with the structure. Physical parameters can include, for example, area of the structure, volume of the structure, and/or materials used in the structure. Physical parameters can also include physical parameters associated with elements within the structure such as, for example, machinery and/or fixtures. For example, a large machine within a structure may pose wireless networking difficulties by blocking transmission of communications between wireless nodes. Physical parameters associated with elements within the structure can include the size and/or location of the elements, as well as material(s) making up the element(s).

Physical parameters can be received via a site survey (e.g., a survey conducted substantially in parallel with an RF survey previously discussed) and/or by other means such as, for example, three dimensional computer-aided design (CAD) mapping and/or analysis of image data. However, embodiments of the present disclosure do not limit method 230 to receiving physical parameters in a particular manner. RF data and physical parameters associated with the structure can be received simultaneously, and/or at different times and/or intervals.

At block 236, method 230 includes determining a number of relay nodes to deploy in the structure based, at least in part, on the radio frequency data and the physical parameters. The number of relay nodes can include, for example, relay nodes 104a, 104b, and 104c previously discussed in connection with FIG. 1. Determining a number of relay nodes to deploy in the structure can include determining a minimum number of relay nodes such that a desired network topology is maintained. For example, a desired network topology can include a determination that each sensor node (e.g., sensor node 102a or 102b) must have two relay nodes within its communication range (e.g., to provide redundancy in the case of a failure of a relay node). Additionally, the desired network topology can include a determination that the relay nodes (e.g., relay nodes 104a, 104b, and 104c) should form an interconnected network.

At block 238, method 230 includes determining a location to deploy each of the number of relay nodes in the structure based, at least in part, on the radio frequency data and the physical parameters. Determining a number of relay nodes to deploy (as briefly discussed in connection with block 236) and determining a location to deploy each of the relay nodes can be related determinations.

For example, a set of sensor nodes (e.g., sensor nodes 102a and 102b) can be deployed in a structure having an internal space denoted Rd. The range of each of the sensor nodes can be denoted r, and as previously discussed, a determination can be made according to the desired network topology that each sensor node should be supported by two relay nodes (e.g., k relay nodes), each having a communication range (R) greater than the sensor node communication range r (e.g., R>>r). Further according to the desired network topology, the deployment location of the relay nodes should enable the sensor nodes to communicate with a gateway node (e.g., gateway node 106), and the relay nodes and gateway node should from an interconnected network (e.g., k connected).

Continuing in the example, the set of sensor nodes within the structure can be defined as S. For each sensor node, $s_i \in S$, a lattice with a width equal to a range of each sensor node (r) and of a chosen resolution ($\epsilon$) can be determined. The possible locations to deploy relay nodes around $s_i$ can be denoted $L_i$, and thus the set of all possible relay nodes (L) can be denoted $L=\cup_i L_i$. At any given instance in time, T can be the set of sensor nodes whose k-cover requirement is fulfilled by a set C of chosen relay nodes. Before the determination, T=☐ and C=☐. Continuing in the example, $T(s_i)$ can be a variable associated with $s_i$ to keep track of its pending requirement to be in communication with a sufficient number of relay nodes, initially set to k for all $s_i$, and then decremented by one if there is any relay node chosen to be in communication with it. A cost, $C_{l_j}=1$, can be associated with each relay node $l_j \in L$, and r-vicinity of $l_j$ can be defined as $V_{l_j}=\{s_i | s_i \in S \wedge d(l_j, s_i) \leq r\}$. A cost efficiency of relay node $l_j$ can be defined as $\eta(l_j) = |\{s_i | s_i \in V_{l_j} \wedge T(s_i) > 0\}|/C_{l_j}$. In each iteration, one $l_j \in L/C$, $l_j$ can be added to C, and the pending requirement of the sensor nodes in $V_{l_j}$ can be updated accordingly until all sensor nodes in the structure are in communication with a sufficient number (k) of relay nodes based upon the desired network topology.

Continuing in the example, determining a deployment of relay nodes can include deploying the relay nodes such that the relay nodes form an interconnected network with a gateway. Accordingly, a determination can be made to consider only the chosen relay nodes C. A complete graph with elements of C as vertices and Euclidean distances between nodes as edge weights can be constructed: (e.g., G=(V, E) where $V=1/l_j \in C$, and $E=(l_i, l_j)|\omega(l_i, l_j)=d(l_i, l_j)$). Determining a deployment of the relay nodes such that the relay nodes form an interconnected network with a gateway can include determining a minimum spanning tree M of G and Steinerization of a number of edges of M in the instance that the weight of the edges is greater than the range of the relay nodes R. Steinerization can include the addition of Steiner points (e.g., relay nodes) on a line join (e.g., wireless connection) of two wireless nodes such that every wireless node on the line join has another wireless node within the distance R.

Determining a number of relay nodes and determining a location of the relay nodes to deploy in the wireless network can include determining a set of relay nodes determined to be likely to have a higher probability of interconnection. For example, $l_k$ can be a chosen relay node at any iteration in the previous example. For all other relay nodes in the structure $l_j \in L/C$ cost update can be performed using the following rules:

$$C_{l_j} = \begin{cases} C_{l_j} - 2\delta & \text{if } d(l_k, l_j) \in (0.9R, R) \\ C_{l_j} + 2\delta & \text{if } d(l_k, l_j) \in (0, 0.5r) \\ C_{l_j} + \delta & \text{if } d(l_k, l_j) \in (0.5r, 0.9r) \\ C_{l_j} - \delta & \text{otherwise} \end{cases}$$

The above rules can prioritize which relay nodes are to be deployed and can allow higher probability of network interconnectivity upon their deployment.

Although not illustrated in FIG. 2, method 230 can include communicating the determined deployment of the wireless network to a user device. A user device can be a computing device analogous to computing device 108. However, embodiments of the present disclosure do not limit the user device to a particular type of device. For example, a user device can be a mobile device (e.g., a cellular telephone and/or a personal digital assistant (PDA), among other mobile devices).

Although not illustrated in FIG. 2, method 230 can include displaying the determined deployment of the wireless network. Displaying the determined deployment can include generating a visual representation (e.g., image) of the structure from a database and/or library (e.g., a library stored in memory 112 previously discussed in connection with FIG. 1), among data storage locations. For example, a user associated with the deployment of the wireless network can access a database to retrieve physical parameters associated with the structure. Embodiments of the present disclosure do not limit representations of the structure to a particular type, size, and/or format. Any format suitable for generating and/or displaying images can be used to generate one or more images of the structure. Additionally and/or alternatively, a user can download a visual representation from an outside source; however, embodiments of the present disclosure do not limit the generation of a display of the structure to a particular method.

Although not illustrated in FIG. 2, method 230 can include simulating the determined deployment of the wireless network in the structure. Simulating can be carried out by, and/or in conjunction with, computing device 108 previously discussed in connection with FIG. 1. Simulating one or more operations of the network can determine (e.g., partially determine) many operational aspects of the network, including, for example, a channel and/or frequency that can be used in the free band, interference levels in the network, signal strength between network nodes, and/or received signal strength indication (RSSI) values for the sensor nodes. Additionally, simulating the network can determine signal strength for relay nodes, and/or a suggested transmit power level at which to operate the sensor nodes.

Further, simulating the network can propose a number of options to a user associated with deploying the wireless network. Proposing options can include, for example, proposing mesh configuration values (e.g., RSSI window size, signal strength threshold, and/or connection sensitivity based on physical parameters associated with the structure, among other mesh configuration values. Additionally, simulation can propose access point configuration values, such as, for example, beacon interval(s), request to send (RTS) threshold(s), delivery traffic indication message(s) (DTIM(s)), and/or basic rates, among other access point configuration values.

The determined deployment of the wireless network can be integrated into the image of the structure to display a visual representation of an actual deployment in the structure. Integration of the determined deployment into the image of the structure can be performed by computing device 108, other computing device(s), and/or combinations of these and/or others. Similarly, simulation of the determined deployment of the wireless network can be performed by computing device 108, other computing device(s), and/or combinations of these, and/or others.

Figure 3:
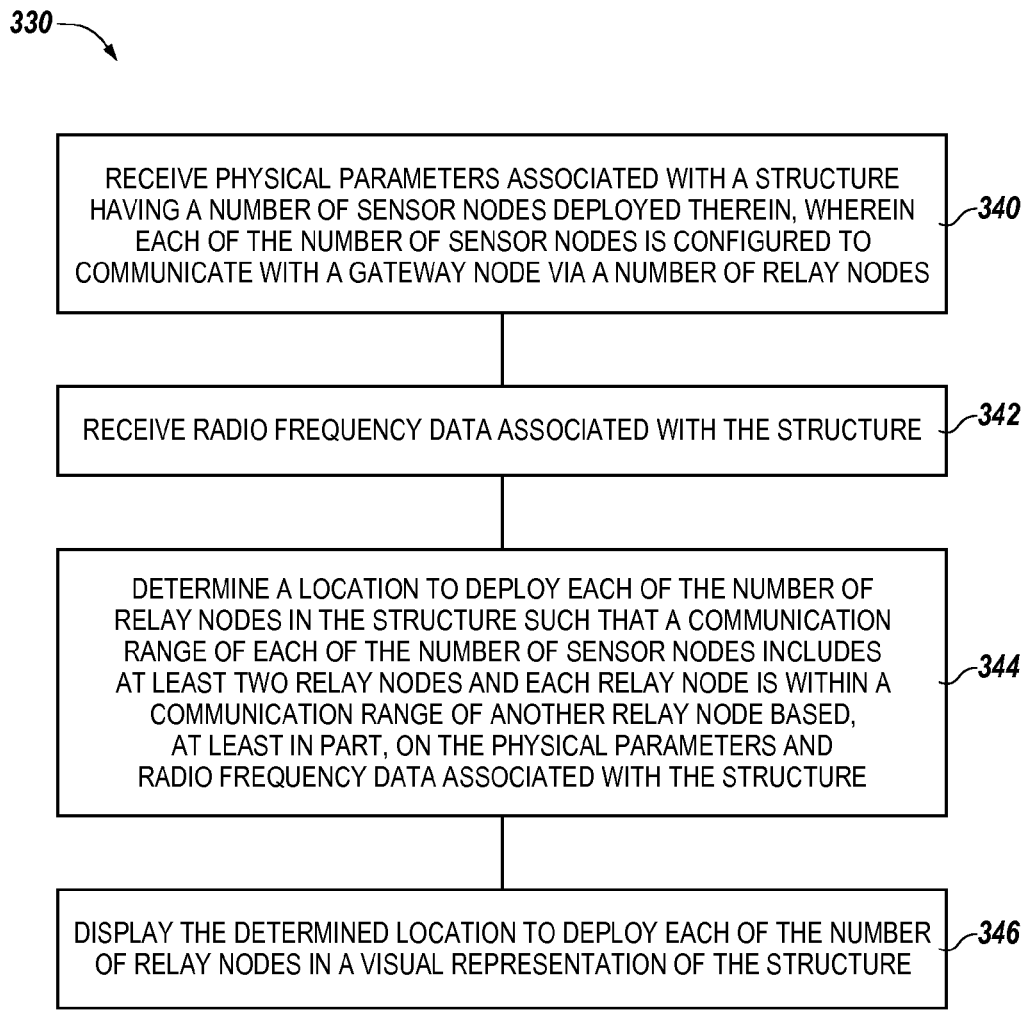
FIG. 3 illustrates a method to determine a deployment of a wireless network in accordance with one or more embodiments of the present disclosure.

FIG. 3 illustrates a method 330 to determine a deployment of a wireless network in accordance with one or more embodiments of the present disclosure. As an example, instructions can be stored in a memory of a computing device and executable by a processor to perform the method 330.

At block 340, instructions are executed to receive physical parameters associated with a structure having a number of sensor nodes deployed therein, wherein each of the number of sensor nodes is configured to communicate with a gateway node via a number of relay nodes, in a manner analogous to that previously discussed.

At block 342, instructions are executed to receive radio frequency data associated with the structure in a manner analogous to receiving radio frequency data previously discussed in connection with FIG. 2.

At block 344, instructions are executed to determine a location to deploy each of the number of relay nodes in the structure such that a communication range of each of the number of sensor nodes includes at least two relay nodes and each relay node is within a communication range of another relay node based, at least in part, on the physical parameters and radio frequency data associated with the structure, in a manner analogous to determining a number of relay nodes and a location for each relay node previously discussed in connection with FIG. 2.

At block 346, instructions are executed to display the determined location to deploy each of the number of relay nodes in a visual representation of the structure in a manner analogous to that previously discussed in connection with FIG. 2.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of determining a deployment of a wireless network associated with a structure, comprising
receiving, via a computing device, radio frequency data associated with the structure, wherein the structure includes a number of sensor nodes and wherein the number of sensor nodes provides the radio frequency data;
receiving physical parameters associated with the structure;
determining a number of relay nodes to deploy in the structure based, at least in part, on the radio frequency data and the physical parameters; and
determining, prior to deploying the number of relay nodes, a location to deploy each of the number of relay nodes in the structure based, at least in part, on the radio frequency data and the physical parameters associated with the structure.

2. The method of claim 1, wherein the method includes determining a location to deploy each of the number of relay nodes in the structure such that a communication range of each of the number of sensor nodes includes at least two relay nodes.

3. The method of claim 1, wherein each relay node is configured to communicatively couple at least one sensor node to a gateway node.

4. The method of claim 1, wherein the method includes displaying a visual representation of the determined location to deploy each of the number of relay nodes in the structure.

5. The method of claim 1, wherein the method includes predicting a number of operations of the wireless network subsequent to determining a location to deploy each of the number of relay nodes in the structure.

6. The method of claim 1, wherein the method includes simulating an operation of the wireless network based, at least in part, on the number of relay nodes and the location to deploy each of the number of relay nodes.

7. The method of claim 6, wherein the method includes deploying each of the number of relay nodes in the structure based, at least in part, on the simulation of an operation of the wireless network.

8. The method of claim 1, wherein the method includes receiving a geographic location of the structure and determining a number of predicted weather conditions affecting the sensor nodes and relay nodes based on the geographic location.

9. The method of claim 1, wherein the method includes communicating the determined location to deploy each of the number of relay nodes in the structure to a user device.

10. A system for determining a deployment of a wireless network associated with a structure, comprising:
a number of sensor nodes deployed in a structure, wherein each of the number of sensor nodes is communicatively coupled to at least one sensor associated with a portion of the structure;
a gateway node;
a number of relay nodes, wherein each relay node is configured to communicatively couple at least one of the sensor nodes to the gateway node; and
a computing device configured to determine a location to deploy each relay node prior to deploying each relay node in the structure such that a communication range of each of the number of sensor nodes includes at least two relay nodes based, at least in part, on the deployment of the number of sensor nodes.

11. The system of claim 10, wherein the structure is an industrial plant.

12. The system of claim 10, wherein the relay nodes and gateway node form an interconnected network.

13. The system of claim 10, wherein the system includes a database storing a number of physical parameters associated with the structure.

14. The system of claim 13, wherein the database is configured to be accessible by a user associated with the deployment of the wireless network to create a visual representation of the structure.

15. The system of claim 10, wherein the system includes a display device configured to display a simulation of the structure indicating the location to deploy each relay node in the structure.

16. A computing device for determining a deployment of a wireless network, comprising:
   a memory; and
   a processor coupled to the memory, wherein the processor is configured to execute executable instructions stored in the memory to:
      receive physical parameters associated with a structure having a number of sensor nodes deployed therein, wherein each of the number of sensor nodes is configured to communicate with a gateway node via a number of relay nodes;
      receive radio frequency data associated with the structure from the number of
      determine a location to deploy each of the number of relay nodes in the structure, prior to deployment of the number of relay nodes in the structure, such that a communication range of each of the number of sensor nodes includes at least two relay nodes and each relay node is within a communication range of another relay node based, at least in part, on the physical parameters and radio frequency data associated with the structure received from the number of sensor nodes; and
      display the determined location to deploy each of the number of relay nodes in a visual representation of the structure.

17. The computing device of claim 16, wherein the processor is configured to execute executable instructions stored in the memory to determine a number of received signal strength indication (RSSI) values for the number of sensor nodes.

18. The computing device of claim 16, wherein the processor is configured to execute executable instructions stored in the memory to determine a suggested transmit power level at which to operate the sensor nodes.

19. The computing device of claim 16, wherein the processor is configured to execute executable instructions stored in the memory to propose a number of network configuration options associated with deploying the wireless network to a user based, at least in part, on the visual representation of the structure.

20. The computing device of claim 16, wherein the processor is configured to execute executable instructions stored in the memory to conduct a simulation of the wireless network using the visual representation based, at least in part, on the physical parameters and radio frequency data.

\* \* \* \* \*